Aug. 18, 1959     A. A. BRUCE     2,900,213
PISTON RING CONSTRUCTION
Filed June 13, 1958
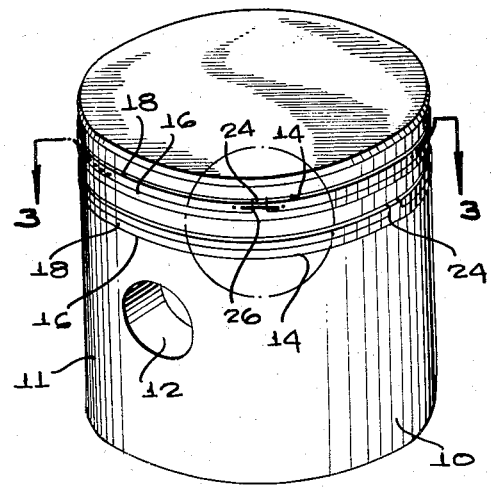
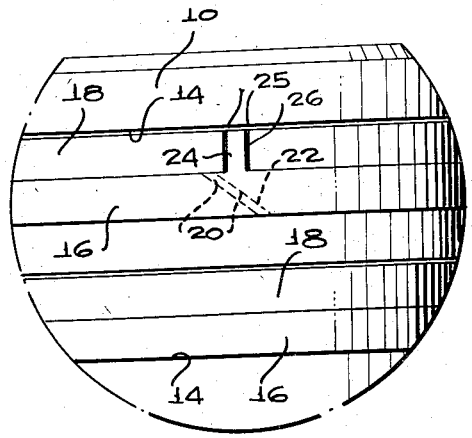
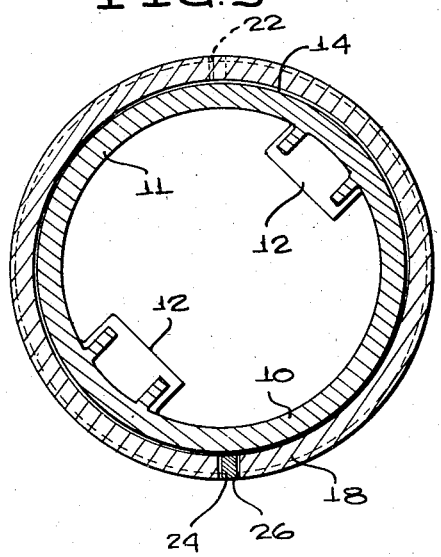
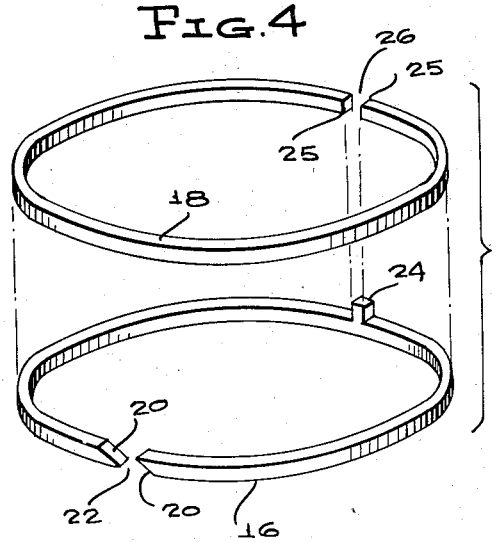
INVENTOR.
AARON A. BRUCE
BY
McMorrow, Berman + Davidson
ATTORNEYS

United States Patent Office 2,900,213
Patented Aug. 18, 1959

2,900,213

PISTON RING CONSTRUCTION

Aaron A. Bruce, Albuquerque, N. Mex.

Application June 13, 1958, Serial No. 741,857

2 Claims. (Cl. 309—46)

This invention relates generally to piston rings, as for example rings of the type used on the pistons of internal combustion engines of automobiles and other self-propelled vehicles.

The main object of the invention is to provide an improved piston ring assembly, so designed that a pair of mating piston rings, having improved means for interlockingly engaging each other in a predetermined relationship, will be mountable in a single ring groove of a piston in the mentioned, predetermined, relationship.

Ordinarily, piston rings are so designed that there is a gap in each ring, as a result of which there is an appreciable loss of compression responsive to wearing of the piston rings and resultant increase in the size of the ring gaps. This loss of compression is particularly accentuated by reason of the fact that it is not uncommon for the rings of a piston to move about the piston into line with each other. In other words, a piston has a plurality of circumferentially extending, split piston rings, said rings being closely spaced apart longitudinally of the piston. The ring gaps sometimes tend to move into alignment in a direction longitudinally of the piston, and this produces a condition commonly called "blow by." When this condition exists, there can be considerable loss of compression resulting from the fact that the aligned splices or ring gaps permit the loss to far greater an extent than would be true, if said splices were not in line but rather, were angularly spaced from one another circumferentially of the piston.

In accordance with the present invention, there is provided, in each of a plurality of ring grooves of a single piston, a pair of piston rings. The rings of each pair differ from one another, in that one ring of each pair has an upwardly projecting lug at a location medially between the opposite ends of said ring. In other words, the ring gap of this ring of each pair is diametrically opposed to the upstanding lug. The other ring of the same pair has its ring gap so disposed as to receive the upstanding lug. Therefore, the mid-length portion of said other ring of a pair is disposed in position closing the ring gap of the lug-provided ring of a pair.

In this way, the gaps of the two rings that are disposed in each ring groove are angularly spaced from one another 180° circumferentially of the rings, with each gap being effectively closed by the intermediate portion of the other ring of the same pair.

When there are two or more pairs of rings, with the rings of each pair being formed and interlocked in the manner described, said pairs being spaced apart longitudinally of the cylinder with each pair in its own groove, it will be obvious that there is no possibility whatever of alignment of ring gaps, and in fact, all the ring gaps of the several individual rings are effectively closed, thereby preventing loss of compression even though the rings may wear over a period of time during which they have had regular use.

Another object is to provide rings adapted to interlock with each other in a single groove of a piston, which rings can be manufactured at little or no increase in cost above that required for the manufacture of conventional rings not having the advantages of the present invention. It is proposed, in this regard, that if there is any increase in cost in the improved rings as compared to conventional rings, said costs will be far outweighed by the great savings resulting from longer effective ring life, and resultant minimum loss of compression of the engine.

Other objects will appear from the following description, the claims appended thereto, and from the annexed drawings in which like reference characters designate like parts throughout the several views and wherein:

Figure 1 is a perspective view of a piston equipped with interlocking rings according to the present invention;

Figure 2 is an enlarged, fragmentary front elevational view of the piston, showing the portion of the piston outlined in dotted lines in Figure 1;

Figure 3 is a transverse sectional view, enlarged above the scale of Figure 1 but on a scale smaller than that of Figure 2, taken substantially on line 3—3 of Figure 1; and Figure 4 is an enlarged, exploded perspective view of a pair of piston rings formed according to the present invention.

Referring to the drawing in detail, designated at 10 is a piston, which is basically conventional, so far as the general shape and functional characteristics thereof are concerned. Thus, the piston has a cylindrical side wall 11, and projecting radially inwardly from said side wall at diametrically opposite locations thereon, and formed integrally with the side wall, are apertured bosses 12, adapted to receive the ends of a wrist pin, not shown, to which the usual connecting rod, also not shown, is pivotally attached.

The piston is provided with spaced, circumferential ring grooves 14. In the illustrated example, the piston has two such grooves, but the number of grooves is not critical to successful operation of the invention. It is mainly important to note that in each of the grooves 14, there is a pair of piston rings designated 16, 18. Each ring, thus, is equal in width to approximately half the width of the groove 14, so that a pair of rings 16, 18, fits snugly into groove 14 in the same manner in which a single piston ring fits in a ring groove in conventional piston and ring constructions.

The particular formation of the rings 16, 18 is of importance. As will be noted, ring 16 has complementarily beveled, spaced ends 20, defining between them a ring gap 22.

Diametrically opposite the ring gap 22, ring 16 is integrally formed with an upstanding, squared lug 24. Lug 24 extends the full thickness of the ring, and in height is equal to the width of the ring 18.

The ring 18 is not provided with a lug, but instead has spaced ends 25 defining between them a ring gap 26 equal, in the installed position of the ring, to the transverse dimension of the lug 24. This is shown to particular advantage in Figure 2 in which it is seen that lug 24 extends between ends 25, snugly fitting in and extending the full height of the ring gap 26. When the rings 16, 18 are installed in their associated groove 14, the lug 24 must necessarily be aligned with the ring gap 26, else the rings will not be capable of installation. The result will be that ring gap 20 and ring gap 26 will be diametrically opposed, and furthermore, the intermediate portion of each ring will extend across the ring gap of the other ring, so that an effective sealing of the ring gaps results, preventing "blow by" and insuring against any possibility of malfunctioning or incorrect installation, since no ring gaps can be aligned with each other in the same piston ring groove.

It follows that the piston ring means mounted in each groove, said piston ring means comprising one ring 17 and its associated ring 18, is devoid of open ring gaps. When a plurality of pairs of the rings is used, as for example in the manner shown in Figure 1, a maximum amount of compression is retained, despite long, hard use of the piston and the installed rings. Any increase in the cost of the rings as compared to conventional rings, accordingly, would obviously be far outweighed by the longer piston ring life and the loss of only a very small amount of compression as compared with that resulting during continued use of conventional rings for a long period of time.

The main feature of the invention is the interlocking arrangement of adjacent rings, preventing alignment of ring gaps. Therefore, it will be apparent that although the invention is believed to work to particular advantage when the specific construction as shown is used, said construction might be varied. Such variations would of course be only those permitted by the scope of the appended claims, but for example, the ends 25 of ring 18 might, instead of being square, be beveled, either oppositely or correspondingly. The ends 20 of ring 16, conversely, might be squared in some embodiments of the invention, or alternatively, might be beveled oppositely rather than correspondingly in the manner shown in Figure 4. While such variations might not be found suitable in all commercial embodiments, they are nevertheless mentioned to show that the main feature of the invention resides in the interlocking characteristic, wherein ring gaps are prevented from aligning and are necessarily kept in diametrically opposed relation, with two rings being provided in each groove of a piston in carrying out the invention.

It will be noted that in use, the dual piston ring assembly comprising rings 16, 18 is mounted in a single piston ring groove 14 the opposite walls (that is, the top and bottom walls viewing the same as in Figure 2) of which are in parallel planes. In this connection, it will be observed that the rings are in superposed relation and are of like diameter, with the rings having one edge in contacting relation, and their other, outside edges in contact with the opposite walls of the piston ring groove. The contacting, inside edges of the rings are coplanar, and since lug 24 extends upwardly in the illustrated embodiment from the inside edge of the ring 16, it will be apparent that said lug extends through the common plane of the contacting, inside edges of the rings 16, 18. It will further be apparent that the lug extends the full distance to the plane of the outside edge of the ring 18, that is, the upper edge of said ring viewing the same as in the several figures of the drawing. Therefore, the lug itself constitutes a solid portion, which, in effect, becomes a part of the ring 18, imparting to the ring 18 a continuous characteristic over the full circumference of the piston ring assembly. The lug 24, in this regard, is of a thickness equal to that of the ring 18 and furthermore, is of a height equal to that of said ring 18, imparting to the ring the desired characteristic of continuity both in height and thickness. Apart from this, it may be noted that the arrangement facilitates manufacture of the rings at a very low cost, since there are no radial projections on the rings, and since the lug is integral with the ring 16. Further, installation of the rings on a wholly conventional piston is effected with ease.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a dual piston ring assembly adapted to be mounted in a single piston ring groove having opposite walls lying in parallel planes, a pair of superposed rings of like diameter each of which is formed with a gap, the gaps of the rings being offset angularly from each other, each of said rings having its opposite edges lying in parallel planes, one edge of one ring extending in contact with one edge of the other ring in coplanar relation therewith, the other edges of the respective rings being adapted to extend in contact with the respective walls of the ring groove, one of said rings having a lug integrally formed upon said one edge thereof in registration with and filling the gap of the other ring, said lug projecting axially of the rings through the common plane of the contacting edges of the rings fully to the plane of the other edge of said other ring.

2. In a dual piston ring assembly, a construction as in claim 1, wherein said lug is in the form of a rectangular projection the width of which is equal to the width of the gap of said other ring, said lug being of a thickness equal to the thickness of said other ring whereby said other ring, when the lug fills the gap thereof, is unchanged in height and thickness throughout its circumference, said lug being confined wholly within the outer circumferences of the rings.

References Cited in the file of this patent

UNITED STATES PATENTS

| | | |
|---|---|---|
| 142,914 | Hodge | Sept. 16, 1873 |
| 242,346 | Matthews | May 31, 1881 |